United States Patent
Hu et al.

(10) Patent No.: US 11,710,875 B2
(45) Date of Patent: Jul. 25, 2023

(54) ONE-STEP MOLDED LITHIUM ION BATTERY SEPARATOR, PREPARATION METHOD AND APPLICATION THEREOF

(71) Applicant: FIBRWAY MATERIAL SCIENCE & TECHNOLOGY DEVELOPMENT CO., LTD., Guangzhou (CN)

(72) Inventors: Jian Hu, Guangzhou (CN); Jin Long, Guangzhou (CN); Yunzhen Yao, Guangzhou (CN); Yi Wang, Guangzhou (CN); Yang Wang, Guangzhou (CN); Ling Meng, Guangzhou (CN)

(73) Assignee: FIBRWAY MATERIAL SCIENCE & TECHNOLOGY DEVELOPMENT CO., LTD., Guangzhou (CN)

(*) Notice: Subject to any disclaimer, the term of this patent is extended or adjusted under 35 U.S.C. 154(b) by 337 days.

(21) Appl. No.: 16/909,065

(22) Filed: Jun. 23, 2020

(65) Prior Publication Data
US 2020/0321578 A1 Oct. 8, 2020

Related U.S. Application Data

(63) Continuation of application No. PCT/CN2017/118480, filed on Dec. 26, 2017.

(51) Int. Cl.
*H01M 50/44* (2021.01)
*H01M 50/451* (2021.01)
(Continued)

(52) U.S. Cl.
CPC ............ *H01M 50/44* (2021.01); *H01M 50/40* (2021.01); *H01M 50/403* (2021.01);
(Continued)

(58) Field of Classification Search
CPC .... H01M 50/40; H01M 50/44; H01M 50/431; H01M 50/411; H01M 50/449; H01M 50/451; H01M 50/457
See application file for complete search history.

(56) References Cited

U.S. PATENT DOCUMENTS

| | | | |
|---|---|---|---|
| 2003/0054236 A1* | 3/2003 | Zucker | H01M 50/44 429/251 |
| 2017/0162849 A1* | 6/2017 | Murakami | B32B 5/32 |
| 2021/0288382 A1* | 9/2021 | Shigematsu | H01M 50/451 |

FOREIGN PATENT DOCUMENTS

| | | |
|---|---|---|
| CN | 201689928 U | 12/2010 |
| CN | 102263290 A | 11/2011 |

(Continued)

OTHER PUBLICATIONS

International Search Report and Written Opinion issued in corresponding PCT Application No. PCT/CN2017/118480, dated Sep. 5, 2018.

(Continued)

*Primary Examiner* — Jonathan G Jelsma
(74) *Attorney, Agent, or Firm* — Westbridge IP LLC

(57) ABSTRACT

A one-step molded lithium ion battery separator and preparation method and application thereof are provided. The battery separator comprises a support layer and a filler layer. The support layer comprises at least two of superfine main fiber, thermoplastic bonded fiber and first nanofiber, and the filler layer comprises at least one of inorganic fillers and third nanofiber. The lithium ion battery separator has a thickness of 19-31 μm, a maximum pore diameter of no more than 1 μm, and a heat shrinkage rate of less than 3% after treatment at 300° C. for 1 hour, and the separator still has a certain strength at a high temperature, ensuring stability and isolation of the rigid structure of the filler layer at a high temperature, satisfying requirements of the separator (Continued)

in terms of heat resistance, pore size and strength, having excellent comprehensive performance.

10 Claims, 1 Drawing Sheet

(51) Int. Cl.
| | |
|---|---|
| *H01M 50/457* | (2021.01) |
| *H01M 50/449* | (2021.01) |
| *H01M 50/40* | (2021.01) |
| *H01M 50/411* | (2021.01) |
| *H01M 50/403* | (2021.01) |
| *H01M 50/417* | (2021.01) |
| *H01M 50/423* | (2021.01) |
| *H01M 50/42* | (2021.01) |
| *H01M 50/414* | (2021.01) |
| *H01M 50/489* | (2021.01) |
| *H01M 50/406* | (2021.01) |
| *H01M 50/434* | (2021.01) |
| *H01M 50/431* | (2021.01) |
| *H01M 10/0525* | (2010.01) |

(52) U.S. Cl.
CPC ....... *H01M 50/406* (2021.01); *H01M 50/411* (2021.01); *H01M 50/414* (2021.01); *H01M 50/417* (2021.01); *H01M 50/42* (2021.01); *H01M 50/423* (2021.01); *H01M 50/431* (2021.01); *H01M 50/434* (2021.01); *H01M 50/449* (2021.01); *H01M 50/451* (2021.01); *H01M 50/457* (2021.01); *H01M 50/489* (2021.01); *H01M 10/0525* (2013.01)

(56) References Cited

FOREIGN PATENT DOCUMENTS

| | | | | |
|---|---|---|---|---|
| CN | 102884654 A | | 1/2013 | |
| CN | 103137931 A | | 6/2013 | |
| CN | 104157812 A | * | 11/2014 | ........ H01M 10/0525 |
| CN | 106522011 A | | 3/2017 | |
| JP | 2005159283 A | | 6/2005 | |
| JP | 2010129308 A | | 6/2010 | |
| JP | 2010202987 A | | 9/2010 | |
| JP | 2012199034 A | | 10/2012 | |
| JP | 2015060702 A | | 3/2015 | |

OTHER PUBLICATIONS

Notice of Reasons for Refusal issued in counterpart Japanese Patent Application No. 2020-533663, dated Jun. 14, 2021.

* cited by examiner

ONE-STEP MOLDED LITHIUM ION BATTERY SEPARATOR, PREPARATION METHOD AND APPLICATION THEREOF

CROSS-REFERENCE TO RELATED APPLICATIONS

This application is a continuation of International Application No. PCT/CN2017/118480, filed on Dec. 26, 2017, the disclosure of which is hereby incorporated by reference in its entirety.

TECHNICAL FIELD

The disclosure relates to the technical field of battery, in particular, to a one-step molded lithium ion battery separator and preparation method and application thereof.

BACKGROUND

With the increase of the energy density, volume and weight of lithium ion batteries, the heat dissipation and stability of the lithium ion batteries deteriorate, so that the phenomenon of thermal runaway is more likely to occur. The battery separator shrinks and melts under a high temperature condition, which causes the positive and negative electrodes to contact with each other and quickly accumulate a large amount of heat, generating high pressure inside the battery, and thus causing the battery to burn or explode. The separator is a key technical material to prevent the short circuit of the battery which greatly accelerates the heat dissipation of battery materials, so that it is critical for the battery safety to improve the thermal stability and fusing temperature of the separator.

At present, lithium ion battery separators are mainly divided into two categories of polyolefin stretched film and non-woven fabric. Polyolefin stretched film (such as polyethylene (PE) or polypropylene (PP) film) has high technology maturity, and has advantages of excellent mechanical properties, chemical stability and relatively lower cost, which is thus currently the dominated separator in the market. However, polyolefin materials have limited temperature resistance, and the suitable working temperature is lower than 150° C. Although the thermal stability of the separator can be effectively improved by coating a high-temperature resistant ceramic on the polyolefin separator, the test at 300° C. shows that the strength of the separator is completely lost, even though the skeleton of the ceramic particles is still present, and thus ceramic coating alone cannot effectively improve the high temperature resistance of the separator. Non-woven fabric is a material with three-dimensional pore structure formed by non-directional accumulation of fibers. It has the characteristics of flexible selection of raw materials and flexible design of structure. As compared to the polyolefin separator, the non-woven fabric separator has advantages in terms of high temperature resistance, rapid charge-and-discharge performance and service life, but the non-woven fabric separator has low strength and large pores, which may cause a micro-short circuit of the battery.

Inorganic fillers have excellent thermal stability. Generally, inorganic particles are coated on the substrates made by polyolefin or non-woven fabric to improve thermal stability. The patent application (Publication No. US20060024569) in the name of Degussa Company in German proposes to use polymer fibers to make a non-woven separator substrate, wherein the substrate is prepared by a single-layer papermaking and both sides are impregnated or coated with a large amount of filler particles to prepare a composite separator which can be used at 200° C. However, due to the composition and structure of the substrate, the separator inevitably has the problems of large pores and dropping-off of the filler particles even impregnated or coated on both sides. Furthermore, after testing, when the separator of this patent is treated at 300° C. for 1 hour, the substrate melts and the strength of the separator is completely lost, and thus the isolation performance of the separator at 300° C. cannot be guaranteed. The patent application (Publication No. CN104157812A) in the name of the South China University of Technology proposes to prepare a three-layer lithium ion battery separator by papermaking and coating technology, however, the dense layer of which uses some synthetic fibers, and thus the thermal stability of the separator can only achieve that heat shrinkage rate at 110° C. is less than 1.0%, which cannot meet requirement of the high temperature resistant separator for the lithium ion battery. Inorganic coating increases the preparation process and costs, and the coating adhered by adhesive is easily damaged, and it is inevitable that the particles will drop-off. The patent application (Publication No. CN106914384A) in the name of Sumitomo Chemical Co., Ltd. in Japan proposes to coat heat-resistant coatings on a polyolefin substrate, wherein the heat-resistant coating material is prepared by dispersing inorganic fillers such as alumina into a solution of aramid in NMP (N-methyl-pyrrolidone). Although this method can effectively improve the heat resistance of the separator, it also adds a coating process and uses organic solvents, which correspondingly increases production costs and environmental and safety control costs.

SUMMARY

The purpose of the disclosure is to provide a one-step molded lithium ion battery separator and preparation method and application thereof. The separator is one-step molded by a multi-layer inclined wire, and thus the production process is simple. This separator has a uniform and compact structure without pinholes, in case that the thickness is not more than 30 μm, it still has a tensile strength of up to 1506 N/mm, a heat shrinkage rate of zero at 110° C., a good strength retention after treatment at 300° C. for 1 h, and the heat shrinkage rate at 300° C. being less than 3%. In addition to meeting the requirements of porosity and strength, the separator has a particularly good heat resistance and excellent comprehensive performance.

The purpose of the disclosure is achieved by the following technical solutions.

On the first aspect, the disclosure provides a one-step molded lithium ion battery separator, comprising or consisting of a support layer and a filler layer, wherein the support layer comprises or consists of at least two of superfine main fiber, thermoplastic bonded fiber and first nanofiber, and the filler layer comprises or consists of at least one of inorganic fillers and third nanofiber.

According to some examples of the present disclosure, the thickness of the separator is 19-31 μm, preferably 19-26 μm; preferably, the basis weight of the separator is 15-30 g/m², preferably 15-25 g/m², more preferably 19-22 g/m²; preferably, the average pore size of the separator is less than 1 μm, preferably 0.2-0.5 μm; preferably, the maximum pore size of the separator is no more than 1.0 μm, preferably 0.7-1 μm; preferably, the heat shrinkage rate of the separator is no more than 2.8% at 300° C.

According to some examples of the present disclosure, the basis weight of the support layer is 6-17 g/m², preferably 8-14 g/m², more preferably 8-11 g/m², most preferably 11 g/m²; the basis weight of the filler layer is 5-19 g/m², preferably 5-16 g/m², more preferably 5-9 g/m², still more preferably 5-7 g/m², most preferably 7 g/m².

According to some examples of the present disclosure, in the support layer, the basis weight of the superfine main fiber is 3-9 g/m², preferably 3-6 g/m², more preferably 5 g/m²; the basis weight of the thermoplastic bonded fiber is 3-9 g/m², preferably 3-6 g/m², more preferably 4 g/m²; the basis weight of the first nanofiber is 0-11 g/m², preferably 2-11 g/m², more preferably 2-8 g/m², still more preferably 2-6 g/m², most preferably 2 g/m².

According to some examples of the present disclosure, the support layer comprises or consists of the superfine main fiber with the basis weight of 3-9 g/m², the thermoplastic bonded fiber with the basis weight of 3-9 g/m² and the first nanofiber with the basis weight of 0-11 g/m².

According to some examples of the present disclosure, the support layer comprises or consists of the superfine main fiber with the basis weight of 3-6 g/m², the thermoplastic bonded fiber with the basis weight of 3-6 g/m² and the first nanofiber with the basis weight of 2-11 g/m².

According to some examples of the present disclosure, the support layer comprises or consists of the superfine main fiber with the basis weight of 5 g/m², the thermoplastic bonded fiber with the basis weight of 4 g/m² and the first nanofiber with the basis weight of 2 g/m².

According to some examples of the present disclosure, in the filler layer, the basis weight of the inorganic particles is 5-19 g/m², preferably 5-16 g/m², more preferably 5-10 g/m², still more preferably 5-7 g/m², most preferably 7 g/m²; the basis weight of the third nanofiber is 0-11 g/m², preferably 2-11 g/m², more preferably 2-8 g/m², still more preferably 2-4 g/m², most preferably 0 g/m² or 2 g/m².

According to some examples of the present disclosure, the filler layer comprises or consists of the inorganic particles with the basis weight of 5-19 g/m² and the third nanofiber with the basis weight of 0-11 g/m².

According to some examples of the present disclosure, the filler layer comprises or consists of the inorganic particles with the basis weight of 5-7 g/m² and the third nanofiber with the basis weight of 0-11 g/m².

According to some examples of the present disclosure, the filler layer comprises or consists of the inorganic particles with the basis weight of 5-7 g/m² and the third nanofiber with the basis weight of 2-11 g/m².

According to some examples of the present disclosure, the filler layer consists of the inorganic particles with the basis weight of 5-7 g/m².

According to some examples of the present disclosure, the filler layer consists of the inorganic particles with the basis weight of 7 g/m².

According to some examples of the present disclosure, the filler layer consists of the inorganic particles with the basis weight of 7 g/m² and the third nanofiber with the basis weight of 2 g/m².

According to some examples of the present disclosure, the sum of the basis weight of the first nanofiber and the third nanofiber is not less than 4 g/m².

According to some examples of the present disclosure, the basis weight of the support layer is 6-17 g/m² and the basis weight of the filler layer is 5-19 g/m².

According to some examples of the present disclosure, the basis weight of the support layer is 8-14 g/m² and the basis weight of the filler layer is 5-16 g/m².

According to some examples of the present disclosure, the basis weight of the support layer is 8-14 g/m² and the basis weight of the filler layer is 5-9 g/m².

According to some examples of the present disclosure, the basis weight of the support layer is 8-11 g/m² and the basis weight of the filler layer is 5-7 g/m².

According to some examples of the present disclosure, the basis weight of the support layer is 8-11 g/m² and the basis weight of the filler layer is 5-7 g/m².

According to some examples of the present disclosure, the basis weight of the support layer is 11 g/m² and the basis weight of the filler layer is 7 g/m².

According to some examples of the present disclosure, the superfine main fiber is selected from one or more of the group consisting of stretched polyethylene terephthalate fiber (stretched PET), polyacrylonitrile fiber (PAN), polyamide fiber (PA) and polypropylene fiber (PP); preferably, the superfine main fiber is stretched polyethylene terephthalate fiber (stretched PET).

According to some examples of the present disclosure, the superfine main fiber has a fiber diameter of 0.1-6 μm, preferably 0.5-4 μm, more preferably 0.5-3 μm, and most preferably 1-3 μm; preferably, the superfine main fiber has a fiber length of 1-6 mm, preferably 2-4 mm, most preferably 3 mm.

According to some examples of the present disclosure, the thermoplastic bonded fiber is selected from one or more of the group consisting of polyethylene fiber (PE), polypropylene fiber (PP), unstretched polyethylene terephthalate fiber (unstretched PET), PP/PE bi-component fiber, PET/PE bi-component fiber, PET/PP bi-component fiber and PET/co-PET bi-component fiber; preferably, the thermoplastic bonded fiber is unstretched polyethylene terephthalate fiber (unstretched PET).

According to some examples of the present disclosure, the thermoplastic bonded fiber has a fiber diameter of 0.1-8 μm, preferably 0.5-6 μm, more preferably 1-5 μm, and most preferably 3-5 μm; preferably, the thermoplastic bonded fiber has a fiber length of 1-6 mm, preferably 2-4 mm.

According to some examples of the present disclosure, the first nanofiber is selected from one or more of the group consisting of fibrillated poly-p-phenylene terephthalamide (PPTA) nanofiber, fibrillated Tencel nanofiber, fibrillated poly-p-phenylene benzodioxazole (PBO) nanofiber, fibrillated polyacrylonitrile (PAN) nanofiber, polyimide (PI) nanofiber and nanocellulose fiber; preferably, the first nanofiber is fibrillated poly-p-phenylene terephthalamide (PPTA) nanofiber or fibrillated Tencel nanofiber.

According to some examples of the present disclosure, the first nanofiber has a beating degree of 70-95° SR, preferably 95° SR.

According to some examples of the present disclosure, the third nanofiber is selected from one or more of the group consisting of fibrillated poly-p-phenylene terephthalamide (PPTA) nanofiber, fibrillated Tencel nanofiber, fibrillated poly-p-phenylene benzodioxazole (PBO) nanofiber and fibrillated polyacrylonitrile (PAN) nanofiber.

According to some examples of the present disclosure, the third nanofiber is fibrillated poly-p-phenylene terephthalamide (PPTA) nanofiber, fibrillated poly-p-phenylene benzodioxazole (PBO) nanofiber or fibrillated polyacrylonitrile (PAN) nanofiber.

According to some examples of the present disclosure, the third nanofiber has a beating degree of 60-85° SR, preferably 85° SR.

According to some examples of the present disclosure, the inorganic fillers are inorganic particles; the inorganic particles are selected from one or more of the group consisting of alumina, silica, boehmite and magnesium hydroxide, preferably alumina.

According to some examples of the present disclosure, the inorganic particles have a particle size of less than 3 μm, preferably less than 1 μm, more preferably 200 nm.

According to some examples of the present disclosure, the lithium ion battery separator further comprises a dense layer, wherein the dense layer, consisting of second nanofiber, is located between the support layer and the filler layer.

According to some examples of the present disclosure, when the basis weight of the third nanofiber is zero in the filler layer, the lithium ion battery separator further comprises a dense layer, wherein the dense layer, consisting of second nanofiber, is located between the support layer and the filler layer.

According to some examples of the present disclosure, the basis weight of the dense layer is 0-12 g/m², preferably 2-12 g/m², more preferably 2-8 g/m², still more preferably 2-4 g/m², most preferably 2 g/m².

According to some examples of the present disclosure, in the dense layer, the basis weight of the second nanofiber is 2-12 g/m², preferably 2-10 g/m², more preferably 2-8 g/m², still more preferably 2-4 g/m², most preferably 2 g/m².

According to some examples of the present disclosure, the sum of the basis weight of the first nanofiber, the second nanofiber and the third nanofiber is not less than 4 g/m².

According to some examples of the present disclosure, the sum of the basis weight of the second nanofiber and the third nanofiber is not less than 2 g/m².

According to some examples of the present disclosure, the second nanofiber is selected from one or more of the group consisting of fibrillated poly-p-phenylene terephthalamide (PPTA) nanofiber, fibrillated Tencel nanofiber, fibrillated poly-p-phenylene benzodioxazole (PBO) nanofiber and fibrillated polyacrylonitrile (PAN) nanofiber.

According to some examples of the present disclosure, the second nanofiber is fibrillated poly-p-phenylene terephthalamide (PPTA) nanofiber, fibrillated Tencel nanofiber, fibrillated poly-p-phenylene benzodioxazole (PBO) nanofiber or fibrillated polyacrylonitrile (PAN) nanofiber.

According to some examples of the present disclosure, the second nanofiber has a beating degree of 60-85° SR, preferably 85° SR.

On the second aspect, the disclosure provides a method for preparing the lithium ion battery separator as mentioned above. The method comprises the following steps in order:

Step a: Mixing the fiber materials of the support layer, the dense layer and the filler layer or the support layer and the filler layer respectively with water, and then each independently defiberizing, beating and mixing, and then diluting with water by a flushing pump to a concentration onto wire;

Step b: Feeding the diluted pulps of the support layer, the dense layer and the filler layer or the support layer and the filler layer into a multi-layer of pulp distributor of Hydroformer, wherein the pulp of the filler layer enters the upper flow channel with a certain flow rate, the pulp of the dense layer enters the middle flow channel with a certain flow rate and the pulp of the support layer enters the flow channel close to a forming wire with a certain flow rate, laminating the pulps in each flow channel in the same area and making papers at the same time, and draining to obtain a wet paper sheet; preferably, further comprising rectification of the pulps to make the pulp appear a flow state of high intensity and micro-scale turbulence before making papers;

Step c: After Step b, drying the wet paper sheet for the separator to obtain a dry paper sheet for the separator by a Yankee dryer; and Step d: After Step c, calendering the dry paper sheet for the separator at a certain temperature by a metal roller and a soft roller to obtain the lithium ion battery separator.

According to some examples of the present disclosure, in step a, the solid weight percent concentrations of the pulps of each layer are 0.2 wt % before diluting with water.

According to some examples of the present disclosure, in step a, the pulp of the support layer onto wire has a concentration of 0.010-0.050 wt %, preferably 0.023-0.049 wt %; the pulp of the dense layer onto wire has a concentration of 0.010-0.050 wt %, preferably 0.02-0.048 wt %; the pulp of the filler layer onto wire has a concentration of 0.05-0.50 wt %, preferably 0.064-0.38 wt %; or, the pulp of the support layer onto wire has a concentration of 0.010-0.050 wt %, preferably 0.023-0.049 wt %; the pulp of the filler layer onto wire has a concentration of 0.03-0.08 wt %, preferably 0.047-0.064 wt %.

According to some examples of the present disclosure, in step b, the pulp of the support layer has a flow rate of flow channel of 100-1000 m³/h, preferably 400-700 m³/h; the pulp of the dense layer has a flow rate of flow channel of 100-1000 m³/h, preferably 200-500 m³/h; the pulp of the filler layer has a flow rate of flow channel of 40-1000 m³/h, preferably 100-500 m³/h; or, the pulp of the support layer has a flow rate of flow channel of 100-1000 m³/h, preferably 500-700 m³/h; the pulp of the filler layer has a flow rate of flow channel of 40-1000 m³/h, preferably 300-500 m³/h.

According to some examples of the present disclosure, in step b, the flow channel close to the forming wire, the middle flow channel and the upper flow channel have a cross-sectional area ratio of (4-7):(2-5):1, preferably 7:2:1 or 4:5:1; or, the flow channel close to the forming wire and the upper flow channel have a cross-sectional area ratio of (1-7):(1-3), preferably 7:3.

According to some examples of the present disclosure, in step c, the drying temperature is 80-130° C.

According to some examples of the present disclosure, in step d, the calendering temperature is 110-220° C.

According to some examples of the present disclosure, when the thermoplastic bonded fiber in the support layer is unstretched PET fiber, the drying temperature is 80-130° C., preferably 120° C., and the calendering temperature is 170-220° C., preferably 190° C.

According to some examples of the present disclosure, when the thermoplastic bonded fiber in the support layer is PET/co-PET bi-component fiber or PP/PE bi-component fiber, the drying temperature is 80-130° C., preferably 90° C.; and the calendering temperature is 110-140° C., preferably 120° C.

In addition, the disclosure also provides a lithium ion battery comprising the lithium ion battery separator as described above.

Compared with the prior art, the present disclosure has the following advantages: the lithium ion battery separator structure of the disclosure can realize one-step molding of all fiber materials, without additional coating process, without adding adhesive, with better pore structure. The special structure and fiber composition of the lithium ion battery separator of the disclosure make it possible to maximize the characteristics of high temperature resistance and high specific surface area of nanofiber at a low basis weight, and thus the lithium ion battery separator has a heat shrinkage rate of less than 3% after treatment at 300° C. for 1 hour and still has good strength, which improves the stability and isolation of the rigid structure of the filler layer of the separator at a high temperature, and solves the problem of filler particles dropping-off.

The disclosure uses one-step molding method by Hydroformer with multi-layer to respectively make the pulps of the support layer, the filler layer and/or the dense layer, then laminate them in the same area with their specific concentration onto wire, the specific flow rate of flow channel and make papers simultaneously, and dry and calender them by metal rollers and soft rollers at the specific temperature so as to obtain a high temperature resistant lithium ion battery separator of the disclosure. More particularly, in the pulp distributor, the hydraulic pressure control cooperates with the specific high-speed pulp flow of the disclosure, so that the pulp with the specific composition and specific concentration of the disclosure generates high intensity and microscale turbulence to eliminate the free surface through controlling the change of the cross-section or geometric size of the fixed element, which is beneficial to the dispersion of fiber pulps and filler particles; then the multi-layer fiber materials are uniformly formed and closely combined in the hydraulic former, which improves the dimensional stability of the separator at a high temperature. The multi-layer fiber materials can be adjusted through the flow and concentration controlling, and with the specific combination of the separator structure of the disclosure and the fiber materials and the inorganic fillers, the nanofiber and the inorganic particles selected in the disclosure have the maximize the high temperature resistance, high surface area characteristics in the specific structure of the disclosure. The reinforcement of superfine main fiber and thermoplastic bonded fiber can also adjust the heat resistance, pore size and strength performance of the separator more efficiently and flexibly, thereby providing reliable technical for the preparation of thinner high temperature resistant lithium ion battery separators.

BRIEF DESCRIPTION OF DRAWINGS

Embodiments of the disclosure are described in detail below with reference to the attached drawing figures, wherein.

DETAILED DESCRIPTION OF THE DISCLOSURE

The disclosure will be further described below in conjunction with specific embodiments. It should be understood that the embodiments of the disclosure are only used to illustrate the disclosure, and are not intended to limit the scope of the disclosure.

The experimental methods without specific conditions in the following examples are generally performed under conventional conditions or according to the conditions recommended by the manufacturer. Unless otherwise defined, all professional and scientific terms used in the text have the same meaning as familiar to those skilled in the art. In addition, any methods and materials similar or equivalent to the described content can be applied to the method of the disclosure. The preferred implementation methods and materials described herein are for demonstration purposes only.

Figure 1:
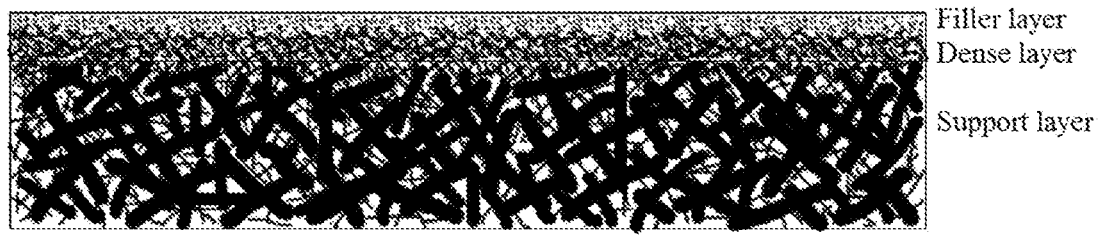
FIG. 1 and FIG. 2 are schematic diagrams of the apparent morphologies of the lithium ion battery separators prepared by the disclosure.
Figure 2:
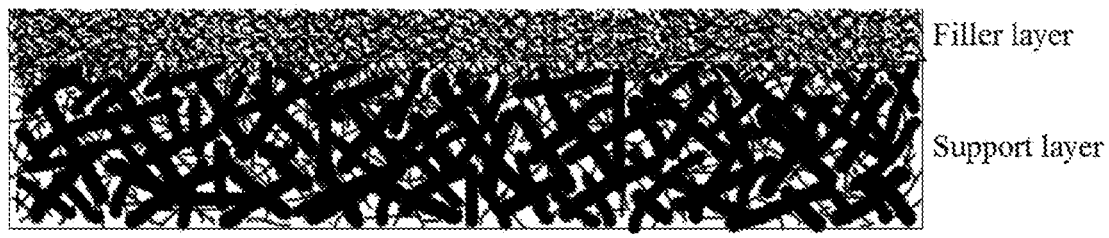
Figure 3:
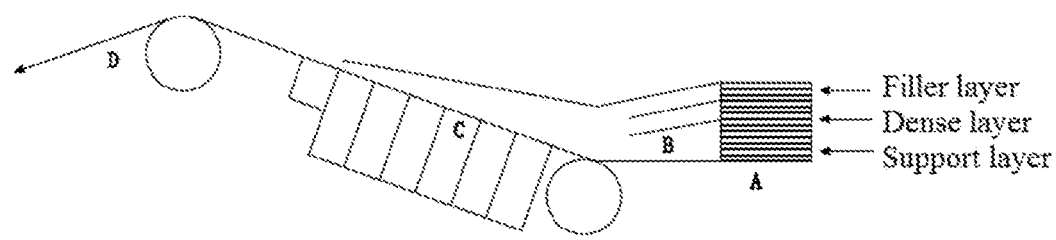
FIG. 3 is a schematic structural view of the Hydroformer with three-layer used in the disclosure, wherein A represents a pulp distributor, B represents a rectifying zone, C represents a forming zone, and D represents a formed wet paper sheet.
Figure 4:
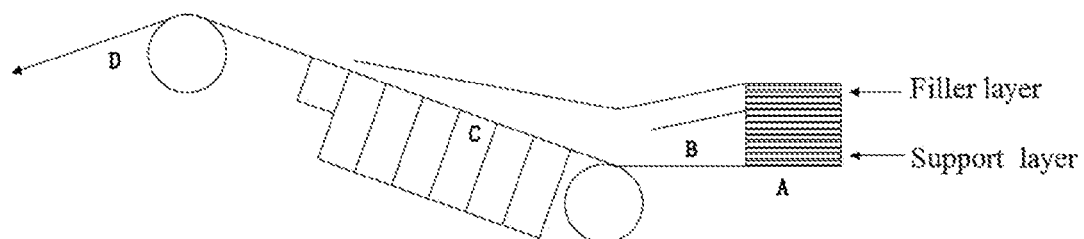
FIG. 4 is a schematic structural view of the Hydroformer with double-layer used in the disclosure, wherein A represents a pulp distributor, B represents a rectifying zone, C represents a forming zone, and D represents a formed wet paper sheet.

The Hydroformer multi-layer inclined wire former, used in the disclosure, has hydraulic pressure control, pulp distributor and rectifying component, and adopts a multi-channel design; wherein, Examples 1-11, 14-20, 23-25 of the disclosure use the Hydroformer with three-layer shown in FIG. 3, and the appearance of the prepared lithium ion battery separator is shown in FIG. 1; Examples 12, 13, 21, 22 of the disclosure use the Hydroformer with double-layer shown in FIG. 4, and the appearance of the prepared lithium ion battery separator is shown in FIG. 2.

The following Examples 1-25 and Comparative Examples 1-15 only disclose examples of using some fiber materials to prepare the lithium ion battery separators, and other fiber materials and combinations thereof given in the disclosure may also be used to prepare the lithium ion battery separators of the disclosure.

Example 1

A one-step molded lithium ion battery separator consists of a three-layer structure of a support layer, a dense layer and a filler layer. The formulas of the support layer, the dense layer and the filler layer are shown in Table 1. The separator is prepared by the following method:

Step a: Mixing the fiber materials of the support layer, the dense layer and the filler layer respectively with water in the defibizer according to the formulas shown in Table 1, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.026 wt % to obtain Pulp 1; the fiber material of the dense layer is diluted to a solid weight percent concentration of 0.040 wt % to obtain Pulp 2; the fiber material of the filler layer is diluted to a solid weight percent concentration of 0.140 wt % to obtain Pulp 3.

Step b: Adjusting the position of the fins in the former to the flow channel close to the forming wire: the middle flow channel: the upper flow channel with the cross-sectional area ratio of (7:2:1); respectively feeding the diluted pulp of each layer into the Hydroformer, a three-layer hydraulic inclined wire former, wherein the pulp 1 enters the flow channel close to the forming wire at a flow rate of 700 m$^3$/h, the pulp 2 enters the middle flow channel at a flow rate of 200 m$^3$/h, the pulp 3 enters the upper flow channel at a flow rate of 100 m$^3$/h; after rectification, making papers of the three layers at the same time, and draining to obtain a wet paper sheet.

Step c: Drying the wet paper sheet obtained in step b to obtain a dry paper sheet for the separator at a temperature of 120° C. by a Yankee dryer.

Step d: Calendering the dry paper sheet obtained in Step c at a temperature of 190° C. by a metal roller and a soft roller to obtain the lithium ion battery separator.

Example 2

A one-step molded lithium ion battery separator consists of a three-layer structure of a support layer, a dense layer and a filler layer. The formulas of the support layer, the dense layer and the filler layer are shown in Table 1. The separator is prepared by the following method:

Step a: Mixing the fiber materials of the support layer, the dense layer and the filler layer respectively with water in the defibizer according to the formulas shown in Table 1, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.031 wt % to obtain Pulp 1; the fiber material of the dense layer is diluted to a solid weight percent concentration of 0.020 wt % to obtain Pulp 2; the fiber material of the filler layer is diluted to a solid weight percent concentration of 0.140 wt % to obtain Pulp 3.

Step b, Step c and Step d are the same as in Example 1.

Examples 3, 4

A one-step molded lithium ion battery separator consists of a three-layer structure of a support layer, a dense layer and a filler layer. The formulas of the support layer, the dense layer and the filler layer are shown in Table 1. The preparation method is the same as that in Example 2.

Example 5

A one-step molded lithium ion battery separator consists of a three-layer structure of a support layer, a dense layer and a filler layer. The formulas of the support layer, the dense layer and the filler layer are shown in Table 1. The separator is prepared by the following method:

Step a: Mixing the fiber materials of the support layer, the dense layer and the filler layer respectively with water in the defibizer according to the formulas shown in Table 1, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.023 wt % to obtain Pulp 1; the fiber material of the dense layer is diluted to a solid weight percent concentration of 0.020 wt % to obtain Pulp 2; the fiber material of the filler layer is diluted to a solid weight percent concentration of 0.100 wt % to obtain Pulp 3.

Step b, Step c and Step d are the same as in Example 1.

Example 6

A one-step molded lithium ion battery separator consists of a three-layer structure of a support layer, a dense layer and a filler layer. The formulas of the support layer, the dense layer and the filler layer are shown in Table 1. The separator is prepared by the following method:

Step a: Mixing the fiber materials of the support layer, the dense layer and the filler layer respectively with water in the defibizer according to the formulas shown in Table 1, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.049 wt % to obtain Pulp 1; the fiber material of the dense layer is diluted to a solid weight percent concentration of 0.020 wt % to obtain Pulp 2; the fiber material of the filler layer is diluted to a solid weight percent concentration of 0.100 wt % to obtain Pulp 3.

Step b, Step c and Step d are the same as in Example 1.

Example 7

A one-step molded lithium ion battery separator consists of a three-layer structure of a support layer, a dense layer and a filler layer. The formulas of the support layer, the dense layer and the filler layer are shown in Table 1. The separator is prepared by the following method:

Step a: Mixing the fiber materials of the support layer, the dense layer and the filler layer respectively with water in the defibizer according to the formulas shown in Table 1, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.030 wt % to obtain Pulp 1; the fiber material of the dense layer is diluted to a solid weight percent concentration of 0.048 wt % to obtain Pulp 2; the fiber material of the filler layer is diluted to a solid weight percent concentration of 0.100 wt % to obtain Pulp 3.

Step b: Adjusting the position of the fins in the former to the flow channel close to the forming wire: the middle flow channel: the upper flow channel with the cross-sectional area ratio of (4:5:1); respectively feeding the diluted pulp of each layer into the Hydroformer, a three-layer hydraulic inclined wire former, wherein the pulp 1 enters the flow channel close to the forming wire at a flow rate of 400 m$^3$/h, the pulp 2 enters the middle flow channel at a flow rate of 500 m$^3$/h, the pulp 3 enters the upper flow channel at a flow rate of 100 m$^3$/h; after rectification, making papers of the three layers at the same time, and draining to obtain a wet paper sheet.

Step c and Step d are the same as in Example 1.

Example 8

A one-step molded lithium ion battery separator consists of a three-layer structure of a support layer, a dense layer and a filler layer. The formulas of the support layer, the dense layer and the filler layer are shown in Table 1. The separator is prepared by the following method:

Step a: Mixing the fiber materials of the support layer, the dense layer and the filler layer respectively with water in the defibizer according to the formulas shown in Table 1, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.023 wt % to obtain Pulp 1; the fiber material of the dense layer is diluted to a solid weight percent concentration of 0.020 wt % to obtain Pulp 2; the fiber material of the filler layer is diluted to a solid weight percent concentration of 0.380 wt % to obtain Pulp 3.

Step b, Step c and Step d are the same as in Example 1.

Example 9

A one-step molded lithium ion battery separator consists of a three-layer structure of a support layer, a dense layer and a filler layer. The formulas of the support layer, the dense layer and the filler layer are shown in Table 1. The separator is prepared by the following method:

Step a: Mixing the fiber materials of the support layer, the dense layer and the filler layer respectively with water in the defibizer according to the formulas shown in Table 1, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.040 wt % to obtain Pulp 1; the fiber material of the dense layer is diluted to a solid weight percent concentration of 0.020 wt % to obtain Pulp 2; the fiber material of the filler layer is diluted to a solid weight percent concentration of 0.100 wt % to obtain Pulp 3.

Step b, Step c and Step d are the same as in Example 1.

Examples 10, 11

A one-step molded lithium ion battery separator consists of a three-layer structure of a support layer, a dense layer and a filler layer. The formulas of the support layer, the dense layer and the filler layer are shown in Table 1. The preparation method is the same as that in Example 7.

Example 12

A one-step molded lithium ion battery separator consists of a two-layer structure of a support layer and a filler layer. The formulas of the support layer and the filler layer are shown in Table 1. The separator is prepared by the following method:

Step a: Mixing the fiber materials of the support layer and the filler layer respectively with water in the defibizer according to the formulas shown in Table 1, defiberizing and beating to a solid weight percent concentration of 0.2 wt %, and then respectively diluting the fiber materials of the support layer and the filler layer by the flushing pump, wherein the fiber material of the support layer is diluted to a solid weight percent concentration of 0.032 wt % to obtain Pulp 1; the fiber material of the filler layer is diluted to a solid weight percent concentration of 0.064 wt % to obtain Pulp 2.

Step b: Adjusting the position of the fins in the former to the flow channel close to the forming wire: the upper flow channel with the cross-sectional area ratio of (5:5); respectively feeding the diluted pulp of each layer into the Hydroformer, a double-layer hydraulic inclined wire former, wherein the pulp 1 enters the flow channel close to the forming wire at a flow rate of 500 m³/h, the pulp 2 enters the middle flow channel at a flow rate of 500 m³/h; after rectification, making papers of the two layers at the same time, and draining to obtain a wet paper sheet.

Step c and Step d are the same as in Example 1.

Example 13

A one-step molded lithium ion battery separator consists of a two-layer structure of a support layer and a filler layer. The formulas of the support layer and the filler layer are shown in Table 1. The separator is prepared by the following method:

Step a: Mixing the fiber materials of the support layer and the filler layer respectively with water in the defibizer according to the formulas shown in Table 1, defiberizing and beating to a solid weight percent concentration of 0.2 wt %, and then respectively diluting the fiber materials of the support layer and the filler layer by the flushing pump, wherein the fiber material of the support layer is diluted to a solid weight percent concentration of 0.040 wt % to obtain Pulp 1; the fiber material of the filler layer is diluted to a solid weight percent concentration of 0.047 wt % to obtain Pulp 2.

Step b: Adjusting the position of the fins in the former to the flow channel close to the forming wire: the upper flow channel with the cross-sectional area ratio of (7:3); respectively feeding the diluted pulp of each layer into the Hydroformer, a double-layer hydraulic inclined wire former, wherein the pulp 1 enters the flow channel close to the forming wire at a flow rate of 700 m³/h, the pulp 2 enters the middle flow channel at a flow rate of 300 m³/h; after rectification, making papers of the two layers at the same time, and draining to obtain a wet paper sheet.

Step c and Step d are the same as in Example 1.

Example 14

A one-step molded lithium ion battery separator consists of a three-layer structure of a support layer, a dense layer and a filler layer. The formulas of the support layer, the dense layer and the filler layer are shown in Table 1. The separator is prepared by the following method:

Step a: Mixing the fiber materials of the support layer, the dense layer and the filler layer respectively with water in the defibizer according to the formulas shown in Table 1, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.031 wt % to obtain Pulp 1; the fiber material of the dense layer is diluted to a solid weight percent concentration of 0.020 wt % to obtain Pulp 2; the fiber material of the filler layer is diluted to a solid weight percent concentration of 0.180 wt % to obtain Pulp 3.

Step b, Step c and Step d are the same as in Example 1.

Examples 15, 16

A one-step molded lithium ion battery separator consists of a three-layer structure of a support layer, a dense layer and a filler layer. The formulas of the support layer, the dense layer and the filler layer are shown in Table 1. The preparation method is the same as that in Example 1.

Examples 17, 18, 19, 20, 23-25

A one-step molded lithium ion battery separator consists of a three-layer structure of a support layer, a dense layer and a filler layer. The formulas of the support layer, the dense layer and the filler layer are shown in Table 1. The separator is prepared by the following method:

Step a and Step b are the same as in Example 2.

Step c: Drying the wet paper sheet obtained in step b to obtain a dry paper sheet for the separator at a temperature of 90° C. by a Yankee dryer.

Step d: Calendering the dry paper sheet obtained in Step c at a temperature of 120° C. by a metal roller and a soft roller to obtain the lithium ion battery separator.

Example 21, 22

A one-step molded lithium ion battery separator consists of a two-layer structure of a support layer and a filler layer. The formulas of the support layer and the filler layer are shown in Table 1. The separator is prepared by the following method:

Step a: Mixing the fiber materials of the support layer and the filler layer respectively with water in the defibizer according to the formulas shown in Table 1, defiberizing and beating to a solid weight percent concentration of 0.2 wt %, and then respectively diluting the fiber materials of the support layer and the filler layer by the flushing pump, wherein the fiber material of the support layer is diluted to a solid weight percent concentration of 0.031 wt % to obtain Pulp 1; the fiber material of the filler layer is diluted to a solid weight percent concentration of 0.06 wt % to obtain Pulp 2.

Step b: Adjusting the position of the fins in the former to the flow channel close to the forming wire: the upper flow channel with the cross-sectional area ratio of (7:3); respectively feeding the diluted pulp of each layer into the Hydroformer, a double-layer hydraulic inclined wire former, wherein the pulp 1 enters the flow channel close to the forming wire at a flow rate of 700 m³/h, the pulp 2 enters the middle flow channel at a flow rate of 300 m³/h; after rectification, making papers of the two layers at the same time, and draining to obtain a wet paper sheet.

Step c and Step d are the same as in Example 1.

Comparative Example 1

A lithium ion battery separator consists of a single layer structure of a support layer. The formula of the support layer is shown in Table 2. The separator is prepared by the following method:

Step a: Mixing the fiber material of the support layer with water in the defibizer according to the formula shown in Table 2, defiberizing to a solid weight percent concentration of 0.2 wt %, and then diluting the fiber material of the support layer by the flushing pump, wherein the fiber materials of the support layer are diluted to a solid weight percent concentration of 0.018 wt % to obtain Pulp 1.

Step b: Feeding the diluted pulp into the Hydroformer, a hydraulic inclined wire former, wherein the flow rate is 1000 m³/h; rectifying and draining to obtain a wet paper sheet.

Step c: Drying the wet paper sheet obtained in step b to obtain a dry paper sheet for the separator at a temperature of 120° C. by a Yankee dryer.

Step d: Calendering the dry paper sheet obtained in Step c at a temperature of 190° C. by a metal roller and a soft roller to obtain the lithium ion battery separator.

Comparative Example 2

A one-step molded lithium ion battery separator consists of a two-layer structure of a support layer and a dense layer. The formulas of the support layer and the dense layer are shown in Table 2. The separator is prepared by the following method:

Step a: Mixing the fiber materials of the support layer and the dense layer respectively with water in the defibizer according to the formulas shown in Table 2, defiberizing and beating to a solid weight percent concentration of 0.2 wt %, and then respectively diluting the fiber materials of the support layer and the dense layer by the flushing pump, wherein the fiber material of the support layer is diluted to a solid weight percent concentration of 0.026 wt % to obtain Pulp 1; the fiber material of the dense layer is diluted to a solid weight percent concentration of 0.027 wt % to obtain Pulp 2.

Step b: Adjusting the position of the fins in the former to the flow channel close to the forming wire: the upper flow channel with the cross-sectional area ratio of (7:3); respectively feeding the diluted pulp of each layer into the Hydroformer, a double-layer hydraulic inclined wire former, wherein the pulp 1 enters the flow channel close to the forming wire at a flow rate of 700 m³/h, the pulp 2 enters the upper flow channel at a flow rate of 300 m³/h; after rectification, making papers of the two layers at the same time, and draining to obtain a wet paper sheet.

Step c: Drying the wet paper sheet obtained in step b to obtain a dry paper sheet for the separator at a temperature of 120° C. by a Yankee dryer.

Step d: Calendering the dry paper sheet obtained in Step c at a temperature of 190° C. by a metal roller and a soft roller to obtain the lithium ion battery separator.

Comparative Example 3

A one-step molded lithium ion battery separator consists of a two-layer structure of a support layer and a filler layer. The formulas of the support layer and the filler layer are shown in Table 2. The separator is prepared by the following method:

Step a: Mixing the fiber materials of the support layer and the filler layer respectively with water in the defibizer according to the formulas shown in Table 2, defiberizing and beating to a solid weight percent concentration of 0.2 wt %, and then respectively diluting the fiber materials of the support layer and the filler layer by the flushing pump, wherein the fiber material of the support layer is diluted to a solid weight percent concentration of 0.026 wt % to obtain Pulp 1; the fiber material of the filler layer is diluted to a solid weight percent concentration of 0.047 wt % to obtain Pulp 2.

Step b: Adjusting the position of the fins in the former to the flow channel close to the forming wire: the upper flow channel with the cross-sectional area ratio of (7:3); respectively feeding the diluted pulp of each layer into the Hydroformer, a double-layer hydraulic inclined wire former, wherein the pulp 1 enters the flow channel close to the forming wire at a flow rate of 700 m³/h, the pulp 2 enters the upper flow channel at a flow rate of 300 m³/h; after rectification, making papers of the two layers at the same time, and draining to obtain a wet paper sheet.

Step c and Step d are the same as in Comparative Example 1.

Comparative Example 4

A one-step molded lithium ion battery separator consists of a three-layer structure of a support layer, a dense layer and a filler layer. The formulas of the support layer, the dense layer and the filler layer are shown in Table 2. The separator is prepared by the following method:

Step a: Mixing the fiber materials of the support layer, the dense layer and the filler layer respectively with water in the defibizer according to the formulas shown in Table 2, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.026 wt % to obtain Pulp 1; the fiber material of the dense layer is diluted to a solid weight percent concentration of 0.030 wt % to obtain Pulp 2; the fiber material of the filler layer is diluted to a solid weight percent concentration of 0.100 wt % to obtain Pulp 3.

Step b: Adjusting the position of the fins in the former to the flow channel close to the forming wire: the middle flow channel: the upper flow channel with the cross-sectional area ratio of (7:2:1); respectively feeding the diluted pulp of each layer into the Hydroformer, a three-layer hydraulic inclined wire former, wherein the pulp 1 enters the flow channel close to the forming wire at a flow rate of 700 m³/h, the pulp 2 enters the middle flow channel at a flow rate of 200 m³/h, the pulp 3 enters the upper flow channel at a flow rate of 100 m³/h; after rectification, making papers of the three layers at the same time, and draining to obtain a wet paper sheet.

Step c and Step d are the same as in Comparative Example 1.

Comparative Example 5

A one-step molded lithium ion battery separator consists of a three-layer structure of a support layer, a dense layer and a filler layer. The formulas of the support layer, the dense layer and the filler layer are shown in Table 2. The separator is prepared by the following method:

Step a: Mixing the fiber materials of the support layer, the dense layer and the filler layer respectively with water in the defibizer according to the formulas shown in Table 2, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.029 wt % to obtain Pulp 1; the fiber material of the dense layer is diluted to a solid weight percent concentration of 0.020 wt % to obtain Pulp 2; the fiber material of the filler layer is diluted to a solid weight percent concentration of 0.100 wt % to obtain Pulp 3.

Step b, Step c and Step d are the same as in Comparative Example 4.

Comparative Example 6

A one-step molded lithium ion battery separator consists of a three-layer structure of a support layer, a dense layer and a filler layer. The formulas of the support layer, the dense layer and the filler layer are shown in Table 2. The separator is prepared by the following method:

Step a: Mixing the fiber materials of the support layer, the dense layer and the filler layer respectively with water in the defibizer according to the formulas shown in Table 2, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.031 wt % to obtain Pulp 1; the fiber material of the dense layer is diluted to a solid weight percent concentration of 0.010 wt % to obtain Pulp 2; the fiber material of the filler layer is diluted to a solid weight percent concentration of 0.100 wt % to obtain Pulp 3.

Step b, Step c and Step d are the same as in Comparative Example 4.

Comparative Example 7

A one-step molded lithium ion battery separator consists of a two-layer structure of a support layer and a filler layer. The formulas of the support layer and the filler layer are shown in Table 2. The separator is prepared by the following method:

Step a: Mixing the fiber materials of the support layer and the filler layer respectively with water in the defibizer according to the formulas shown in Table 2, defiberizing and beating to a solid weight percent concentration of 0.2 wt %, and then respectively diluting the fiber materials of the support layer and the filler layer by the flushing pump, wherein the fiber material of the support layer is diluted to a solid weight percent concentration of 0.029 wt % to obtain Pulp 1; the fiber material of the filler layer is diluted to a solid weight percent concentration of 0.047 wt % to obtain Pulp 2.

Step b, Step c and Step d are the same as in Comparative Example 3.

Comparative Example 8

A one-step molded lithium ion battery separator consists of a two-layer structure of a support layer and a filler layer. The formulas of the support layer and the filler layer are shown in Table 2. The separator is prepared by the following method:

Step a: Mixing the fiber materials of the support layer and the filler layer respectively with water in the defibizer according to the formulas shown in Table 2, defiberizing and beating to a solid weight percent concentration of 0.2 wt %, and then respectively diluting the fiber materials of the support layer and the filler layer by the flushing pump, wherein the fiber material of the support layer is diluted to a solid weight percent concentration of 0.045 wt % to obtain Pulp 1; the fiber material of the filler layer is diluted to a solid weight percent concentration of 0.070 wt % to obtain Pulp 2.

Step b: Adjusting the position of the fins in the former to the flow channel close to the forming wire: the upper flow channel with the cross-sectional area ratio of (4:1); respectively feeding the diluted pulp of each layer into the Hydroformer, a double-layer hydraulic inclined wire former, wherein the pulp 1 enters the flow channel close to the forming wire at a flow rate of 800 m³/h, the pulp 2 enters the upper flow channel at a flow rate of 200 m³/h; after rectification, making papers of the two layers at the same time, and draining to obtain a wet paper sheet.

Step c and Step d are the same as in Comparative Example 1.

Comparative Example 9

A one-step molded lithium ion battery separator consists of a three-layer structure of a support layer, a dense layer and a filler layer. The formulas of the support layer, the dense layer and the filler layer are shown in Table 2. The separator is prepared by the following method:

Step a: Mixing the fiber materials of the support layer, the dense layer and the filler layer respectively with water in the defibizer according to the formulas shown in Table 2, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.040 wt % to obtain Pulp 1; the fiber material of the dense layer is diluted to a solid weight percent concentration of 0.043 wt % to obtain Pulp 2; the fiber material of the filler layer is diluted to a solid weight percent concentration of 0.100 wt % to obtain Pulp 3.

Step b: Adjusting the position of the fins in the former to the flow channel close to the forming wire: the middle flow channel: the upper flow channel with the cross-sectional area ratio of (3:6:1); respectively feeding the diluted pulp of each layer into the Hydroformer, a three-layer hydraulic inclined wire former, wherein the pulp 1 enters the flow channel close to the forming wire at a flow rate of 300 m³/h, the pulp 2 enters the middle flow channel at a flow rate of 600 m³/h, the pulp 3 enters the upper flow channel at a flow rate of 100 m³/h; after rectification, making papers of the three layers at the same time, and draining to obtain a wet paper sheet.

Step c and Step d are the same as in Comparative Example 1.

Comparative Example 10

A one-step molded lithium ion battery separator consists of a three-layer structure of a support layer, a dense layer and a filler layer. The formulas of the support layer, the dense layer and the filler layer are shown in Table 2. The separator is prepared by the following method:

Step a: Mixing the fiber materials of the support layer, the dense layer and the filler layer respectively with water in the defibizer according to the formulas shown in Table 2, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.031 wt % to obtain Pulp 1; the fiber material of the dense layer is diluted to a solid weight percent concentration of 0.050 wt % to obtain Pulp 2; the fiber material of the filler layer is diluted to a solid weight percent concentration of 0.080 wt % to obtain Pulp 3.

Step b, Step c and Step d are the same as in Comparative Example 4.

Comparative Example 11

A one-step molded lithium ion battery separator consists of a two-layer structure of a support layer and a filler layer. The formulas of the support layer and the filler layer are shown in Table 2. The separator is prepared by the following method:

Step a: Mixing the fiber materials of the support layer and the filler layer respectively with water in the defibizer according to the formulas shown in Table 2, defiberizing and beating to a solid weight percent concentration of 0.2 wt %, and then respectively diluting the fiber materials of the support layer and the filler layer by the flushing pump, wherein the fiber material of the support layer is diluted to a solid weight percent concentration of 0.023 wt % to obtain Pulp 1; the fiber material of the filler layer is diluted to a solid weight percent concentration of 0.147 wt % to obtain Pulp 2.

Step b, Step c and Step d are the same as in Comparative Example 3.

Comparative Example 12, 13

A one-step molded lithium ion battery separator consists of a three-layer structure of a support layer, a dense layer and a filler layer. The formulas of the support layer, the dense layer and the filler layer are shown in Table 2. The separator is prepared by the following method:

Step a: Mixing the fiber materials of the support layer, the dense layer and the filler layer respectively with water in the defibizer according to the formulas shown in Table 2, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.046 wt % to obtain Pulp 1; the fiber material of the dense layer is diluted to a solid weight percent concentration of 0.020 wt % to obtain Pulp 2; the fiber material of the filler layer is diluted to a solid weight percent concentration of 0.100 wt % to obtain Pulp 3.

Step b, Step c and Step d are the same as in Comparative Example 4.

Comparative Examples 14, 15

A one-step molded lithium ion battery separator consists of a three-layer structure of a support layer, a dense layer and a filler layer. The formulas of the support layer, the dense layer and the filler layer are shown in Table 2. The separator is prepared by the following method:

Step a: Mixing the fiber materials of the support layer, the dense layer and the filler layer respectively with water in the defibizer according to the formulas shown in Table 2, defiberizing and beating to a solid weight percent concentration of 0.2 wt %, and then respectively diluting the fiber materials of the support layer, the dense layer and the filler layer by the flushing pump, wherein the fiber material of the support layer is diluted to a solid weight percent concentration of 0.043 wt % to obtain Pulp 1; the fiber material of the dense layer is diluted to a solid weight percent concentration of 0.020 wt % to obtain Pulp 2; the fiber material of the filler layer is diluted to a solid weight percent concentration of 0.100 wt % to obtain Pulp 3.

Step b, Step c and Step d are the same as in Comparative Example 4.

TABLE 1

Fiber material formulations of Examples 1-25 (g/m²)

| Examples | | Superfine main fiber | Thermoplastic bonded fiber | First nanofiber | Second nanofiber | Third nanofiber | Inorganic particles |
|---|---|---|---|---|---|---|---|
| Example 1 | Support layer | 5 $^{a)}$ | 4 $^{d)}$ | — | — | — | — |
| | Dense layer | — | — | — | 4 $^{h)}$ | — | — |
| | Filler layer | — | — | — | — | — | 7 $^{k)}$ |
| Example 2 | Support layer | 5 $^{a)}$ | 4 $^{d)}$ | 2 $^{g)}$ | — | — | — |
| | Dense layer | — | — | — | 2 $^{h)}$ | — | — |
| | Filler layer | — | — | — | — | — | 7 $^{k)}$ |
| Example 3 | Support layer | 5 $^{a)}$ | 4 $^{d)}$ | 2 $^{h)}$ | — | — | — |
| | Dense layer | — | — | — | 2 $^{g)}$ | — | — |
| | Filler layer | — | — | — | — | — | 7 $^{k)}$ |
| Example 4 | Support layer | 5 $^{a)}$ | 4 $^{d)}$ | 2 $^{h)}$ | — | — | — |
| | Dense layer | — | — | — | 2 $^{h)}$ | — | — |
| | Filler layer | — | — | — | — | — | 7 $^{k)}$ |

TABLE 1-continued

Fiber material formulations of Examples 1-25 (g/m²)

| Examples | | Superfine main fiber | Thermoplastic bonded fiber | First nanofiber | Second nanofiber | Third nanofiber | Inorganic particles |
|---|---|---|---|---|---|---|---|
| Example 5 | Support layer | 3 a) | 3 d) | 2 g) | — | — | — |
| | Dense layer | — | — | — | 2 h) | — | — |
| | Filler layer | — | — | — | — | — | 5 k) |
| Example 6 | Support layer | 3 a) | 3 d) | 11 g) | — | — | — |
| | Dense layer | — | — | — | 2 h) | — | — |
| | Filler layer | — | — | — | — | — | 5 k) |
| Example 7 | Support layer | 3 a) | 3 d) | — | — | — | — |
| | Dense layer | — | — | — | 12 h) | — | — |
| | Filler layer | — | — | — | — | — | 5 k) |
| Example 8 | Support layer | 3 a) | 3 d) | 2 g) | — | — | — |
| | Dense layer | — | — | — | 2 h) | — | — |
| | Filler layer | — | — | — | — | — | 19 k) |
| Example 9 | Support layer | 3 a) | 9 d) | 2 g) | — | — | — |
| | Dense layer | — | — | — | 2 h) | — | — |
| | Filler layer | — | — | — | — | — | 5 k) |
| Example 10 | Support layer | 9 a) | 3 d) | 2 g) | — | — | — |
| | Dense layer | — | — | — | 2 h) | — | — |
| | Filler layer | — | — | — | — | — | 5 k) |
| Example 11 | Support layer | 6 a) | 6 d) | 2 g) | — | — | — |
| | Dense layer | — | — | — | 2 h) | — | — |
| | Filler layer | — | — | — | — | — | 5 k) |
| Example 12 | Support layer | 3 a) | 3 d) | 2 g) | — | — | — |
| | Filler layer | — | — | — | — | 11 h) | 5 k) |
| Example 13 | Support layer | 6 a) | 6 d) | 2 g) | — | — | — |
| | Filler layer | — | — | — | — | 2 h) | 5 k) |
| Example 14 | Support layer | 5 a) | 4 d) | 2 g) | — | — | — |
| | Dense layer | — | — | — | 2 h) | — | — |
| | Filler layer | — | — | — | — | 2 h) | 7 k) |
| Example 15 | Support layer | 5 b) | 4 d) | 2 g) | — | — | — |
| | Dense layer | — | — | — | 2 h) | — | — |
| | Filler layer | — | — | — | — | — | 7 k) |
| Example 16 | Support layer | 5 c) | 4 d) | 2 g) | — | — | — |
| | Dense layer | — | — | — | 2 h) | — | — |
| | Filler layer | — | — | — | — | — | 7 k) |
| Example 17 | Support layer | 5 a) | 4 e) | 2 g) | — | — | — |
| | Dense layer | — | — | — | 2 h) | — | — |
| | Filler layer | — | — | — | — | — | 7 k) |
| Example 18 | Support layer | 5 a) | 4 f) | 2 g) | — | — | — |
| | Dense layer | — | — | — | 2 h) | — | — |
| | Filler layer | — | — | — | — | — | 7 k) |
| Example 19 | Support layer | 5 a) | 4 b) | 2 g) | — | — | — |
| | Dense layer | — | — | — | 2 i) | — | — |
| | Filler layer | — | — | — | — | — | 7 k) |
| Example 20 | Support layer | 5 a) | 4 b) | 2 g) | — | — | — |
| | Dense layer | — | — | — | 2 j) | — | — |
| | Filler layer | — | — | — | — | — | 7 k) |
| Example 21 | Support layer | 5 a) | 4 b) | 2 g) | — | — | — |
| | Filler layer | — | — | — | — | 2 i) | 7 k) |
| Example 22 | Support layer | 5 a) | 4 b) | 2 g) | — | — | — |
| | Filler layer | — | — | — | — | 2 j) | 7 k) |
| Example 23 | Support layer | 5 a) | 4 b) | 2 g) | — | — | — |
| | Dense layer | — | — | — | 2 h) | — | — |
| | Filler layer | — | — | — | — | — | 7 l) |
| Example 24 | Support layer | 5 a) | 4 b) | 2 g) | — | — | — |
| | Dense layer | — | — | — | 2 h) | — | — |
| | Filler layer | — | — | — | — | — | 7 m) |
| Example 25 | Support layer | 5 a) | 4 b) | 2 g) | — | — | — |
| | Dense layer | — | — | — | 2 h) | — | — |
| | Filler layer | — | — | — | — | — | 7 n) |

Note:
a) Stretched PET fiber with a fiber diameter of 2 μm and a fiber length of 3 mm;
b) PAN fiber with a fiber diameter of 2 μm and a fiber length of 3 mm;
c) PA fiber with a fiber diameter of 2 μm and a fiber length of 3 mm;
d) Unstretched PET fiber with a fiber diameter of 4 μm and a fiber length of 3 mm;
e) PET/co-PET bi-component fiber with a fiber diameter of 4 μm and a fiber length of 3 mm;
f) PP/PE bi-component fiber with a fiber diameter of 4 μm and a fiber length of 3 mm;
g) Fibrillated Tencel nanofiber with a beating degree of 95° SR, Lenzing, Austria;
h) Fibrillated PPTA nanofiber with a beating degree of 85° SR, DuPont Kevlar of the United States;
i) Fibrillated PBO nanofiber with a beating degree of 85° SR, Japan Toyobo Company;
j) Fibrillated PAN nanofiber with a beating degree of 85° SR;
k) Alumina nanoparticles with an average diameter of 200 nm;
l) Silica nanoparticles with an average diameter of 200 nm;
m) Boehmite nanoparticles with an average diameter of 200 nm;
n) Magnesium hydroxide nanoparticles with an average diameter of 200 nm.

TABLE 2

Fiber material formulations of Comparative Examples 1-15 (g/m²)

| Comparative Examples | | Superfine main fiber | Thermoplastic bonded fiber | First nanofiber | Second nanofiber | Third nanofiber | Inorganic particles |
|---|---|---|---|---|---|---|---|
| Comparative Example 1 | Support layer | 5 a) | 4 b) | — | — | — | — |
| Comparative Example 2 | Support layer | 5 a) | 4 b) | — | — | — | — |
| | Dense layer | — | — | — | 4 d) | — | — |
| Comparative Example 3 | Support layer | 5 a) | 4 b) | — | — | — | — |
| | Filler layer | — | — | — | — | — | 7 e) |
| Comparative Example 4 | Support layer | 5 a) | 4 b) | — | — | — | — |
| | Dense layer | — | — | — | 3 d) | — | — |
| | Filler layer | — | — | — | — | — | 7 e) |
| Comparative Example 5 | Support layer | 5 a) | 4 b) | 1 c) | — | — | — |
| | Dense layer | — | — | — | 2 d) | — | — |
| | Filler layer | — | — | — | — | — | 7 e) |
| Comparative Example 6 | Support layer | 5 a) | 4 b) | 2 c) | — | — | — |
| | Dense layer | — | — | — | 1 d) | — | — |
| | Filler layer | — | — | — | — | — | 7 e) |
| Comparative Example 7 | Support layer | 5 a) | 4 b) | 1 c) | — | — | — |
| | Filler layer | — | — | — | — | 2 d) | 7 e) |
| Comparative Example 8 | Support layer | 3 a) | 3 b) | 12 c) | — | — | — |
| | Filler layer | — | — | — | — | 2 d) | 5 e) |
| Comparative Example 9 | Support layer | 3 a) | 3 b) | — | — | — | — |
| | Dense layer | — | — | — | 13 d) | — | — |
| | Filler layer | — | — | — | — | — | 5 e) |
| Comparative Example 10 | Support layer | 5 a) | 4 b) | 2 d) | — | — | — |
| | Dense layer | — | — | — | 5 d) | — | — |
| | Filler layer | — | — | — | — | — | 4 e) |
| Comparative Example 11 | Support layer | 3 a) | 3 b) | 2 c) | — | — | — |
| | Filler layer | — | — | — | — | 2 d) | 20 e) |
| Comparative Example 12 | Support layer | 3 a) | 2 b) | 11 c) | — | — | — |
| | Dense layer | — | — | — | 2 d) | — | — |
| | Filler layer | — | — | — | — | — | 5 e) |
| Comparative Example 13 | Support layer | 2 a) | 3 b) | 11 c) | — | — | — |
| | Dense layer | — | — | — | 2 d) | — | — |
| | Filler layer | — | — | — | — | — | 5 e) |
| Comparative Example 14 | Support layer | 3 a) | 10 b) | 2 c) | — | — | — |
| | Dense layer | — | — | — | 2 d) | — | — |
| | Filler layer | — | — | — | — | — | 5 e) |
| Comparative Example 15 | Support layer | 10 a) | 3 b) | 2 c) | — | — | — |
| | Dense layer | — | — | — | 2 d) | — | — |
| | Filler layer | — | — | — | — | — | 5 e) |

Note:
a) Stretched PET fiber with a fiber diameter of 2 μm and a fiber length of 3 mm;
b) Unstretched PET fiber with a fiber diameter of 4 μm and a fiber length of 3 mm;
c) Fibrillated Tencel nanofiber with a beating degree of 95° SR, Lenzing, Austria;
d) Fibrillated PPTA nanofiber with a beating degree of 85° SR, DuPont Kevlar of the United States;
e) Alumina nanoparticles with an average diameter of 200 nm.

Performance Test of the Lithium Ion Battery Separator

The lithium ion battery separators prepared in Examples 1-25 and Comparative Examples 1-15 were tested for performance. The test items and methods are as follows:

1. Basis weight, thickness and tensile strength: measured by TAPPI standard.

2. Average pore size and maximum pore size: measured using a PMI pore size analyzer.

3. Heat shrinkage rate

The dimensional stability of the separator at a certain temperature can be characterized by the thermal stability of the separator, usually expressed in heat shrinkage rate. Test of the heat shrinkage rate of the separator as follows:

Cutting the separator into squares with side length $L_b$, and then respectively placing the separator in an environment of 110° C. and 300° C. for 1 hour, testing the side length $L_a$ of the separator, and calculating the shrinkage rate according to the following formula:

$$\text{Shrinkage rate } (\%) = (L_b - L_a)/L_b \times 100$$

4. Separator strength retention

The separator was placed in a 300° C. environment for 1 hour and taken out. The strength retention of the separator was evaluated according to the following criteria:
○: Fold the separator 10 times without breaking;
Δ: Fold the separator 2-10 times and break;
×: Fold the separator once and break.

TABLE 3

Performance test parameters of the lithium ion battery separator of the disclosure

| Parameters | Basis weight of finished separators g/m² | Thickness μm | Tensile Strength N/m | Average Pore Size μm | Maximum Pore Size μm | Heat Shrinkage Rate % at 300° C. | Strength Retention |
|---|---|---|---|---|---|---|---|
| Example 1 | 20.2 | 25.8 | 1203 | 0.28 | 0.76 | 1.8 | ○ |
| Example 2 | 20.1 | 25.7 | 1235 | 0.23 | 0.68 | 1.8 | ○ |
| Example 3 | 20.2 | 25.7 | 1222 | 0.26 | 0.74 | 2.0 | ○ |
| Example 4 | 20.2 | 25.7 | 1208 | 0.27 | 0.76 | 1.8 | ○ |
| Example 5 | 15.1 | 19.2 | 608 | 0.35 | 0.97 | 2.8 | ○ |
| Example 6 | 24.3 | 29.9 | 753 | 0.30 | 0.88 | 2.7 | ○ |
| Example 7 | 23.2 | 29.4 | 674 | 0.32 | 0.91 | 2.5 | ○ |
| Example 8 | 28.9 | 29.9 | 652 | 0.22 | 0.79 | 0.8 | ○ |
| Example 9 | 21.2 | 29.2 | 1506 | 0.30 | 0.90 | 2.8 | ○ |
| Example 10 | 21.1 | 29.2 | 902 | 0.31 | 0.90 | 2.8 | ○ |
| Example 11 | 21.2 | 29.4 | 1354 | 0.32 | 0.91 | 2.8 | ○ |
| Example 12 | 24.1 | 29.6 | 705 | 0.33 | 0.95 | 2.5 | ○ |
| Example 13 | 20.8 | 29.2 | 1353 | 0.30 | 0.90 | 2.8 | ○ |
| Example 14 | 21.9 | 28.2 | 1257 | 0.23 | 0.80 | 1.5 | ○ |
| Example 15 | 20.2 | 25.5 | 1208 | 0.25 | 0.85 | 1.8 | ○ |
| Example 16 | 20.3 | 25.3 | 1202 | 0.26 | 0.86 | 1.8 | ○ |
| Example 17 | 20.1 | 25.9 | 1189 | 0.26 | 0.88 | 1.8 | ○ |
| Example 18 | 20.4 | 25.8 | 1197 | 0.26 | 0.87 | 1.8 | ○ |
| Example 19 | 19.8 | 25.7 | 1221 | 0.28 | 0.88 | 1.8 | ○ |
| Example 20 | 20.1 | 25.9 | 1219 | 0.26 | 0.86 | 1.8 | ○ |
| Example 21 | 20.2 | 26.2 | 1220 | 0.26 | 0.88 | 1.8 | ○ |
| Example 22 | 19.7 | 25.8 | 1218 | 0.25 | 0.87 | 1.8 | ○ |
| Example 23 | 19.6 | 25.7 | 1222 | 0.24 | 0.80 | 1.8 | ○ |
| Example 24 | 19.3 | 25.7 | 1218 | 0.25 | 0.78 | 1.8 | ○ |
| Example 25 | 20.1 | 25.7 | 1215 | 0.24 | 0.81 | 1.8 | ○ |

Note:
The lithium ion battery separator of the disclosure has a heat shrinkage rate of zero at 110° C.

TABLE 4

Performance test parameters of the lithium ion battery separator

| Parameters | Basis weight g/m² | Thickness μm | Tensile Strength N/m | Average Pore Size μm | Maximum Pore Size μm | Heat Shrinkage Rate % at 300° C. | Strength Retention |
|---|---|---|---|---|---|---|---|
| Comparative Example 1 | 9.2 | 15.5 | 865 | 5.8 | 44 | Melting | X |
| Comparative Example 2 | 12.9 | 20.5 | 913 | 1.42 | 2.45 | 4.5 | Δ |
| Comparative Example 3 | 9.8 | 16.0 | 853 | 5.43 | 40 | Melting | X |
| Comparative Example 4 | 17.1 | 22.9 | 1105 | 0.28 | 1.32 | 1.8 | ○ |
| Comparative Example 5 | 17.2 | 22.6 | 1110 | 0.27 | 1.29 | 1.8 | ○ |
| Comparative Example 6 | 17.3 | 22.4 | 1128 | 0.26 | 1.18 | 2.0 | Δ |
| Comparative Example 7 | 17.1 | 22.5 | 1112 | 0.27 | 1.38 | 1.8 | ○ |
| Comparative Example 8 | 25.1 | 31.1 | 763 | 0.30 | 0.88 | 2.8 | ○ |
| Comparative Example 9 | 24.1 | 30.7 | 681 | 0.32 | 0.91 | 2.5 | ○ |
| Comparative Example 10 | 20.0 | 27.2 | 1274 | 0.45 | 1.32 | 3.8 | ○ |
| Comparative Example 11 | 30.1 | 30.7 | 657 | 0.21 | 0.75 | 2.8 | ○ |
| Comparative Example 12 | 22.8 | 28.2 | 454 | 0.31 | 0.88 | 2.8 | ○ |
| Comparative Example 13 | 22.9 | 28.2 | 548 | 0.32 | 0.91 | 2.8 | ○ |
| Comparative Example 14 | 21.9 | 30.9 | 1504 | 0.32 | 0.88 | 2.8 | ○ |
| Comparative Example 15 | 21.7 | 30.6 | 908 | 0.32 | 0.93 | 2.8 | ○ |

It can be seen from Table 3 that the lithium ion battery separators obtained in Examples 1-25 of the disclosure have a thickness less than 30 µm. The separators have a multilayer structure, comprising a support layer, a filler layer and/or a dense layer. The maximum pore size of the lithium ion battery separators is less than 1 µm, the strength is more than 600 N/m, and the filler particles do not drop-off. The heat shrinkage rate at 110° C. is zero, and the separators still have a certain strength at 300° C. for 1 hour and the heat shrinkage rate is less than 3.0%, and thus the separators have excellent thermal stability.

It can be seen from Table 4 that in Comparative Example 1, the separator is only made of PET fiber, wherein the pore size is larger, and the separator melts at 300° C.; in Comparative Example 2, the separator without inorganic nanofillers has large pore size, and the heat shrinkage rate of the separator is more than 3.0% after treatment at 300° C. for 1 h; in Comparative Example 3, no nanofiber is used, and the PET fiber has large pores, which cannot effectively trap inorganic nanofiller particles, so that the separator obtained have pinholes, the pore size is large, and the separator melts at 300° C.; in Comparative Examples 4, 5, 6 and 7, the total amount of the nanofiber is less than 4 g/m², the inorganic nanofiller particles are reduced in the forming zone, which cannot effectively cover the fiber layer, resulting in a larger pore size of the separator and a more loss of the basis weight; in Comparative Examples 8, 9, 11, 14 and 15, the thickness of the separator is more than 30 µm, which is not conducive to the control of the volume and energy density of batteries; in Comparative Example 10, the amount of the inorganic particles in the filler layer is less than 5 g/m², which cannot effectively cover the fiber layer, resulting in a larger pore size of the separator; in Comparative Examples 12 and 13, the amount of PET fiber is too few so that the strength of the separator cannot meet the requirements.

It should be understood that the disclosure described herein is not limited to specific methodologies, experimental protocols, or reagents, as these may vary. The discussion and examples provided herein are presented to describe specific embodiments and are not intended to limit the scope of the disclosure, which is limited only by the claims.

What is claimed is:

1. A one-step molded lithium ion battery separator, comprising a support layer, a dense layer and a filler layer, wherein the dense layer is located between the support layer and the filler layer;
   the support layer comprises superfine main fiber in an amount of 3-6 g/m², thermoplastic bonded fiber in an amount of 3-6 g/m² and first nanofiber in an amount of 2-11 g/m²; the superfine main fiber is stretched polyethylene terephthalate fiber with a fiber diameter of 0.1-6 gm and a fiber length of 1-6 mm; the thermoplastic bonded fiber is unstretched polyethylene terephthalate fiber with a fiber diameter of 0.1-8 µm and a fiber length of 1-6 mm; the first nanofiber is selected from one or more of the group consisting of fibrillated poly-p-phenylene terephthalamide (PPTA) nanofiber and fibrillated lyocell nanofiber both with a beating degree of 70-95° SR;
   the dense layer consists of second nanofiber; the second nanofiber is in an amount of 2-12 g/m²; the second nanofiber is selected from one or more of the group consisting of fibrillated poly-p-phenylene terephthalamide (PPTA) nanofiber and fibrillated polyacrylonitrile (PAN) nanofiber; the second nanofiber has a beating degree of 60-85° SR;
   the filler layer comprises inorganic particles in an amount of 5-19 g/m² and third nanofiber in an amount of 0-11 g/m²; the inorganic particles are alumina with a particle size of less than 3 µm; the third nanofiber has a beating degree of 60-85° SR; the third nanofiber is selected from one or more of the group consisting of fibrillated poly-p-phenylene terephthalamide nanofiber, fibrillated poly-p-phenylene benzodioxazole (PBO) nanofiber and fibrillated polyacrylonitrile nanofiber;
   a thickness of the separator is 19-26 µm; a basis weight of the separator is 15-30 g/m²; a maximum pore size of the separator is no more than 1.0 µm; a heat shrinkage rate of the separator is no more than 2.8% at 300° C.;
   a sum of the first nanofiber, the second nanofiber and the third nanofiber is not less than 4 g/m².

2. The lithium ion battery separator according to claim 1, wherein, a a basis weight of the separator is 15-25 g/m²; the average pore size of the separator is 0.2-0.5 µm; a maximum pore size of the separator is 0.7-1 µm.

3. The lithium ion battery separator according to claim 1, wherein, a basis weight of the support layer is 8-14 g/m²; a basis weight of the filler layer is 5-16 g/m².

4. A lithium ion battery comprising the lithium ion battery separator according to claim 1.

5. The lithium ion battery separator according to claim 1, wherein, a basis weight of the support layer is 8-11 g/m²; a basis weight of the filler layer is 5-9 g/m²; a basis weight of the dense layer is 2-8 g/m².

6. The lithium ion battery separator according to claim 1, wherein, the superfine main fiber is stretched polyethylene terephthalate fiber with a fiber diameter of 0.5-4 µm and a fiber length of 2-4 mm.

7. The lithium ion battery separator according to claim 1, wherein, the thermoplastic bonded fiber is unstretched polyethylene terephthalate fiber with a fiber diameter of 0.5-6 µm and a fiber length of 2-4 mm.

8. The lithium ion battery separator according to claim 1, wherein, the first nanofiber has a beating degree of 95° SR.

9. The lithium ion battery separator according to claim 1, wherein, the second nanofiber has a beating degree of 85° SR.

10. The lithium ion battery separator according to claim 1, wherein, the inorganic particles are alumina with a particle size of less than 1 µm.

* * * * *